United States Patent [19]
Fujii et al.

[11] Patent Number: 4,603,086
[45] Date of Patent: Jul. 29, 1986

[54] RADIATION CURABLE ORGANIC SILICON COMPOUNDS AND RELEASING CURED FILMS COMPRISING CURED PRODUCTS OF SAID COMPOUNDS

[75] Inventors: Hitoshi Fujii, Kasukabe; Hideo Fujimura, Koshigaya; Hisashi Aoki; Kiyohiro Kondow, both of Annaka, all of Japan

[73] Assignees: Dai Nippon Insatsu Kabushiki Kaisha; Shin-Etsu Kagaku Kogyo Kabushiki Kaisha, both of Japan

[21] Appl. No.: 707,679

[22] Filed: Mar. 4, 1985

[30] Foreign Application Priority Data

Mar. 12, 1984 [JP] Japan ................................. 59-45499

[51] Int. Cl.$^4$ ................................................ B32B 9/04
[52] U.S. Cl. ...................................... 428/447; 522/99; 528/26; 528/38; 427/35; 427/54.1; 427/387

[58] Field of Search ............... 528/26, 38; 204/159.13; 427/387, 54.1, 35; 428/447; 522/99

[56] References Cited

U.S. PATENT DOCUMENTS 4,082,635  4/1978  Fritz et al. ............................ 528/26
4,293,397  10/1981  Sato et al. ............................ 528/26

Primary Examiner—Melvyn I. Marquis
Attorney, Agent, or Firm—Parkhurst & Oliff

[57] ABSTRACT

The present invention relates to an organopolysiloxane material which is cured rapidly by irradiating it with radiation such as ultraviolet rays, electron beam and X-rays to provide a film having good characteristics, which can be readily produced synthetically and which is stable, as well as the material's cured releasing film. The material is obtained by the reaction of (A), an organic silicon compound having a specific formula and having at least one amino group, and (B), an acrylic compound having at least two acrylate groups.

3 Claims, No Drawings

RADIATION CURABLE ORGANIC SILICON COMPOUNDS AND RELEASING CURED FILMS COMPRISING CURED PRODUCTS OF SAID COMPOUNDS

BACKGROUND OF THE INVENTION

This invention relates to an organopolysiloxane or silane capable of rapidly curing by means of irradiation of radiation including ultraviolet rays and ionizing radiation to provide a film having good characteristics and relates to a cured releasing film comprising its cured filmy product.

The previously known radiation curable organopolysiloxanes or silanes are:

(a) compounds having one (meth)acryloxy group per each Si such as $CH_2=CRCOOR'Si$ wherein R is hydrogen or methyl, and R' is a divalent hydrocarbon group (Japanese Patent Publication No.31910/1977), and $CH_2=CRCOOSi$ wherein R is as defined above (Japanese Patent Publication No.2912/1978);

(b) compounds having two (meth)acryloxy groups per each Si through different bonds, i.e., SiC and SiOC, such as $CH_2=CRCOO(CH_2)_3SiOC_2H_4OCOCR=CH_2$ wherein R is as defined above (Japanese Patent Publication No. 57096/1982); and (c) compounds having three (meth)acryloxy groups per each Si through an SiOC bond such as $SiOCH_2C-(CH_2OCOCH=CH_2)_3$ (Japanese Patent Publication No. 35720/1977).

However, it is well known that the SiOC-type compounds have low water resistance, and that the SiC-type compounds cannot be readily produced.

SUMMARY OF THE INVENTION

It is a main object of the present invention to provide a novel organopolysiloxane material having good radiation curing characteristics while remaining stable and wherein it is very readily produced synthetically.

It is another object of the present invention to provide a cured releasing film comprising the material's cured filmy products.

A radiation curable organic silicon compound of the present invention has been developed in order to achieve the objects described above. More particularly, the radiation curable organic silicon compound of the present invention is a reaction product of the following components (A) and (B):

Where (A) is an organopolysiloxane having at least one amino group per molecule, represented by the following formula: ps
$$[H_2N.(CH_2CH_2NH)_cR^1]_a.R^2_b.SiO_{(4-a-b)/2} \quad (1)$$
wherein $R^1$ is a divalent hydrocarbon group, $R^2$ is a substituted or unsubstituted monovalent hydrocarbon group, a and b are positive numbers which meet the relations: $0<a\leqq 3$, $0<b\leqq 3$ and $0<a+b\leqq 4$, and c is 0 or 1, and (B) is an acrylic compound having at least two acrylate groups per molecule, represented by the following formula:

$$\begin{matrix} R^3 \\ | \\ CH_2=C-CO-O- \end{matrix} \quad (2)$$

wherein $R^3$ is hydrogen or a methyl group.

Furthermore, a cured releasing film of the present invention comprises a cured filmy product obtained by irradiating the above described organic silicon compound of the present invention with radiation.

The organic silicon compound of the present invention (sometimes referred to as "organopolysiloxane") can be readily produced synthetically by a Michael addition reaction of component (A) having at least one amino group and component (B) having at least two (meth)acrylate groups. The organic silicone compound of the present invention can be cured rapidly by radiation without using any solvent because siloxane groups and acrylate groups are present in one molecule in a suitably discrete state. The organic silicon compound of the present invention is an organopolysiloxane having excellent curability and releasability, and has excellent storage stability, as compared with the prior art SiOC-type organopolysiloxane.

DETAILED DESCRIPTION OF THE INVENTION

The present invention will be described in more detail hereinafter. In the following description, all "percentages" and "parts" representing the composition are by weight, unless otherwise indicated.

The component (A) which constitutes the organic silicon compound of the present invention has the structure represented by the general formula (1) described above, and the meaning of groups in the formula is as defined above. Specific examples of $R^1$ are alkylene groups such as methylene, ethylene and propylene groups, cycloalkylene groups and phenylene groups. Specific examples of $R^2$ are alkyl groups such as methyl, ethyl and propyl groups, alkenyl groups such as vinyl and allyl groups, aryl groups such as phenyl group, alkoxyl groups such as methoxy and ethoxy groups; and monovalent organic groups wherein a portion of hydrogen atoms attached to the carbon atom of these groups is substituted by a halogen atom, cyano group or the like. The bond position of amino group is not restricted so long as the component (A) has the composition represented by the formula described above. The component (A) may have either a linear or branched chain structure. The molecular weight of the component (A) may vary whether it is siloxane or silane, and may have broad ranges. When the component (A) is used in the absence of a solvent, the component (A) for use herein has a viscosity of no more than about 2,000 poises, preferably no more than 100 poises at room temperature.

Specific examples of the component (A) are as follows: (Me=methyl group, $\phi$=phenyl group)

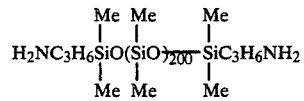

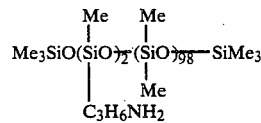

$$H_2NC_3H_6Si(OC_2H_5)_3$$

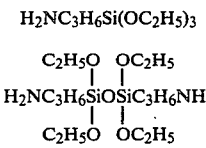

-continued $$\begin{array}{c} CH_3 \ CH_3 \\ | \ \ | \\ H_2NC_3H_6SiOSiC_3H_6NH_2 \\ | \ \ | \\ CH_3 \ CH_3 \end{array}$$

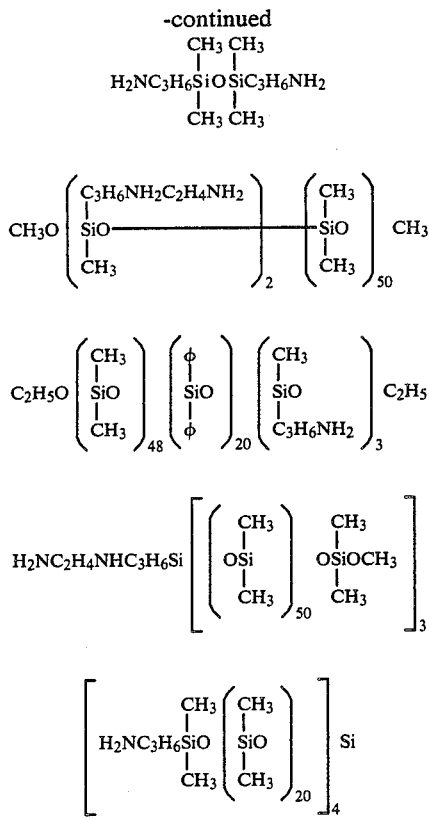

The organic silicon compound as described above (component (A)) is, for example, prepared as follows:

(1) Hydrolysis of Alkoxysilane
For example, 2 moles of

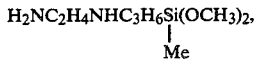

10 moles of $(CH_3)_2Si(OCH_3)_2$ and 11 moles of water are subjected to co-hydrolysis to obtain an amino group-containing polysiloxane of the following general formula:

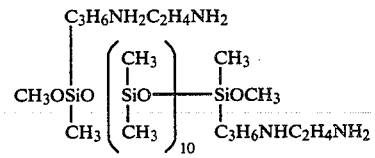

(2) Equilibrium
For example, one mole of

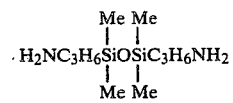

and 50 moles of $((CH_3)_2SiO)_4$ are equilibrated in the presence of KOH as a catalyst to obtain an amino group-containing polysiloxane of the following general formula:

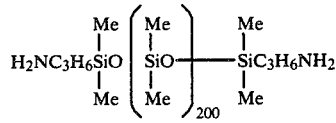

The acrylic compound (B) may have either a linear or branched chain structure provided that it has at least two (meth)acrylate groups as represented by the formula (2) described above. Specific examples of the acrylic compounds include neopentyl glycol diacrylate, ethylene glycol diacrylate, triethylene glycol diacrylate, polyethylene glycol (MW400) diacrylate, 1,6-hexane glycol diacrylate, polypropylene glycol (MW400) diacrylate, trimethylolethane triacrylate, trimethylolpropane triacrylate, and tetramethylolmethane triacrylate, as well as methacrylates corresponding to these acrylates.

By reacting the above described component (A) with the above described component (B), an organic silicon compound of the present invention is obtained as a compound wherein the whole or part of hydrogen atoms attached to nitrogen atoms present are substituted by a group formed by hydrogen addition to one of two acrylic unsaturated groups of the component (B) described above, for example, by the following group when the component (B) is neopentyl glycol diacrylate.

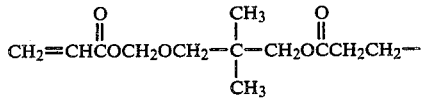

The reaction of the components (A) and (B) described above is generally known as Michael addition reaction. For example, the reaction of the components (A) and (B) may be carried out by incorporating an acrylate in amounts of at least equimolar proportion to a primary amino group, optionally adding a solvent to form a uniform solution and reacting at a temperature of from room temperature to 100° C. The upper limit of the reaction amount of the acrylate to the amino group is an excess of about 10% over the number of hydrogen atoms attached to nitrogens. While the acrylate may be used in a larger amount and present in a system as an excess material, it acts as a coreactant during curing. If an amount of the acrylate is too small, the acrylate group to be present reacts with unreacted NH to significantly interfere with storage stability.

The above described organic silicon compounds of the present invention can be used in combination of two or more compounds. The combination of an organopolysiloxane having at least 50 siloxane units and a silane or organopolysiloxane having 1–50 siloxane units at a weight ratio of from 1:0.3 to 1:3.0 is preferable from the standpoint of the balance among radiation curability, adhesion between the compounds and a substrate and the hardness of the cured film.

The thus obtained organic silicon compound of the present invention can be itself cured by irradiating it with ionizing radiation. Optionally, in order to render the organic silicon compound ultraviolet curable, a photosensitizer can be added in an amount of up to about 10 parts, preferably from 0.5 to 2 parts based on 100 parts of the present organic silicon compound. The known photosensitizers can be used in the present invention. Specific examples of the photosensitizers include acetophenone, propiophenone, benzophenone, ethylbenzophenone, benzoquinone, p-diacetylbenzene, 1,3-diphenylacetone, xanthone, fluorenone, benzaldehyde, anthraquinone, triphenylamine, carbazole, 3-methylacetophenone, 4-chlorobenzophenone, 4,4'-dimethoxybenzophenone, benzfuran, benzoin, benzoin isopropyl ether, and organic silicon group-containing benzophenone derivatives having excellent compatibility with organopolysiloxane disclosed in Japanese Patent Publication No.48794/1976.

A (meth)acrylate monomer may be incorporated in the organic silicon compound of the present invention at a level of up to about 50 parts based on 100 parts of the organic silicon compound in order to improve curability, the hardness of the resulting cured film and adhesion between the compound and a substrate, or the monomer may be used as a diluent or the like. When the (meth)acrylate monomer is used in combination with the organic silicon compound, it is desirable that the (meth)acrylate monomer be suitably selected depending upon the use of the product. For example, in order to use the monomer as a diluent or to lower film hardness, a monofunctional acrylate is used. In order to improve adhesion, an acrylate having an alcohol residue containing at least two carbon atoms or monoacrylate having a polar group such as OH, NH and epoxy is used. In order to improve curability or film hardness, a polyfunctional acrylate illustrated as the above described component (B) is used.

Antioxidants such as hydroquinone can be optionally incorporated as a pot life extender in the present organic silicon compound-based composition. It is desirable that the amount of the antioxidant used be from 50 to 1000 ppm. Conventional diorganopolysiloxanes, fillers, colorants and other additives also may be added depending upon uses of the final product, provided that they do not impair the features of the composition.

The organic silicon compound of the present invention has excellent characteristics such as radiation curability, adhesion to a substrate or the like, and the insulating properties, heat resistance, solvent resistance and mechanical properties of a cured product. Accordingly, it is possible to utilize the organic silicon compound of the present invention in a wide range of uses. For example, the organic silicon compound of the present invention can be effectively used as a main component of various compositions such as solvent-free coatings requiring rapid curability, adhesives (sealing agents and caulking materials), surface modifiers by application of plastics (solvent resistance, chemical resistance, impact resistance and wear resistance), modifiers for synthetic fibers (resistance to washing, antistatic properties, durability and water repellency), potting materials as insulating materials for electrical components, coating materials for printed board, etching resist in printed wiring, coatings for resist printing, masking reagents for electroless plating, and printing inks. In order to utilize the excellent film characteristics and releasability of a cured filmy product, it is preferable that the organic silicon compound be used as a main component of a raw material of cured releasing films of the present invention, which constitutes release paper or the like.

In order to obtain a cured releasing film of the present invention, a coating composition which is based on the above described organic silicon compound of the present invention is applied onto a suitable solid substrate to obtain a radiation curable coating film. Examples of suitable sheet-shaped substrates for providing, for example, release paper include glassine paper, clay coated paper, wood-free paper, polyethylene laminated paper, plastic film, and metallic foil. The suitable coating weight is from about 0.5 to about 5 grams per square meter.

The coating composition can be readily adjusted to a viscosity suitable for application, i.e., from 500 to 1000 centistrokes by adjusting the molecular weight or by dilution. The coating composition can be applied by general processes such as roll coating, gravure coating and air-knife coating without dilution with a solvent. Even in the case of a high viscosity of at least 10,000 centistokes, the coating composition can be applied by means of a solvent-free laminator coater having a coating head wherein heated metallic rolls and rubber or plastic coated rolls are alternately disposed and intermediate rolls swing (Japanese Patent Laid-Open Pub. No. 71662/1982). According to this process, it is possible to apply a coating composition having a viscosity of up to 200,000 centistokes (25° C.).

Examples of radiation which cures the coating film thus formed include ultraviolet rays, electron beam and γ-rays.

Xenon lamps, low pressure, moderate pressure or high pressure mercury lamps and the like can be used as a source for ultraviolet rays. More specifically, a preferred source of ultraviolet rays for use herein is one having an output per unit length of from 80 to 160 W/cm, a dominant wavelength of about 365 nm and a wavelength range of from about 230 to about 450 nm. The irradiation time is generally no more than several seconds. In order to prevent heat influence, it is preferable that the irradiation time be short. The irradiation time is more preferably no more than one second, most preferably no more than 0.1 second. The irradiation time may be no more than one second per each lamp having an electrical power input of 160 W/cm. Electron beam accelerators of various types such as van de Graaff-type, resonance transformer-type, linear-type, dynatron-type, and high frequency-type can be used as a source of electron beam. Electron beam having energy of from 50 to 1000 KeV, preferably from 100 to 300 KeV discharged therefrom may be irradiated in a dose of from 0.1 to 10 M Rads. Particularly preferred source of electron beam is one wherein continuous curtain-like beam is irradiated from linear filaments. Examples of commercially available sources of electron beam are Electro Curtain CB 200/50/30 available from Energy Sciences Inc., and NP-ESH 150 available from Otto Durr.

The thus obtained cured releasing film of the present invention is obtained by curing of organopolysiloxane having acrylate groups in molecules per se and exhibiting excellent stability and curability. Accordingly, releasability and residual adhesion are excellent. The cured releasing film is suitable for use as surface materials for molded section or release paper. Furthermore, the cured releasing film is also useful as a single film obtained by peeling off from the releasing surface after curing.

When the organic silicon compound of the present invention is used other than for film formation, its curing conditions and the like may be suitably modified by reference to the above described film formation conditions.

The non-limiting examples illustrate the present invention.

EXAMPLE 1

A one liter 4-necked flask was charged with 99.4 grams (0.44 mole) of 1,6-hexanediol diacrylate and 200 ml of toluene. The mixture was then heated up to 70° C., and 1490 grams (0.1 mole) of dimethylpolysiloxane blocked with aminopropyl (dimethyl) siloxy groups (a viscosity of 630 cp at 25° C.) was added dropwise. The reaction mixture was stirred for 30 minutes at a temperature of 80° C., and thereafter the solvent and the excess acrylate were stripped off to obtain organopolysiloxane containing polyfunctional acrylate at both ends (a viscosity of 1050 cp at 25° C.). This is referred to as a product I.

Trimethylolpropane triacrylate was reacted with the siloxane described above in the same manner as described above. The resulting product is referred to as a product II. Also, 1,6-hexanediol dimethacrylate was reacted with the siloxane described above in the same manner as described above. The resulting product is referred to as a product III.

Each of products I, II and III was applied to an acrylic plate to a thickness of 0.1 mm thereby to prepare each sample. The samples were irradiated with electron beam having an acceleration voltage of 165 kV and an irradiation dose of 2 M rads in an atmosphere having an oxygen concentration of 50 ppm by means of an electron beam irradiation apparatus (manufactured by ESI) to cure the coating film.

Two parts of p-ethylbenzophenone was added to 100 parts of each of the products I, II and III described above in the same manner as described above to obtain each coating composition. The coating composition was applied to an acrylic plate in the same manner as described above to prepare each sample. Then each sample was irradiated with ultraviolet rays having a dominant wavelength of 365 nm in a nitrogen atmosphere (an O₂ concentration of 200 ppm) for 110 seconds (160 W/cm.lamp) to cure the coating film.

For comparison, a product IV was obtained in the same manner as described above except that a siloxane containing γ-acryloxypropyl(dimethyl) siloxy groups at both ends and having a degree of polymerization of 200 and a viscosity of 530 cp (25° C.) was used. The curing process described above was carried out.

The general physical properties of the cured products are summarized in Table 1.

TABLE 1

| Curing Process | Siloxane | Curability | Adhesion | Solvent Resistance | Pencil Hardness |
|---|---|---|---|---|---|
| Electron Beam | I | 2 M rads | Good | Good | H |
| | II | 2 M rads | Good | Good | 2H |
| | III | 5 M rads | Good | Good | HB |
| | IV | >10 M rads | Peeled off | Poor | 4B |
| Ultraviolet Rays | I | 0.6 sec. | Good | Good | HB |
| | II | 0.6 sec. | Good | Good | F |
| | III | 1.2 sec. | Peeled off | Good | B |
| | IV | 5.0 sec. | Peeled off | Poor | 6B |

Note:
Curability: ultraviolet rays 160 W/cm · lamp
Solvent resistance: samples were immersed for 24 hours in toluene.

EXAMPLE 2

Twenty parts of trimethylolpropane triacrylate which was polyfunctional acrylate was added to 100 parts of each of the siloxanes I and II described in Example 1 to prepare each product. The same curing test as described in Example 1 was carried out. The results are shown in Table 2.

TABLE 2

| Curing Process | Siloxane | Curability | Adhesion | Solvent Resistance | Pencil Hardness |
|---|---|---|---|---|---|
| EB | I | 1 M rad | Good | Good | 2H |
| | II | 1 M rad | Peeled off | Good | 4H |
| UV | I | 0.6 sec. | Good | Good | F |
| | II | 0.6 sec. | Peeled off | Good | 2H |

EXAMPLE 3

Neopentyl glycol diacrylate was reacted with a dimethylpolysiloxane blocked with aminopropyl (dimethyl) siloxy groups having a polymerization degree n=300 and a viscosity of 1430 cp (25° C.), and siloxane having a polymerization degree n=18 and a viscosity of 20 cp (25° C.), respectively. The resulting two products were blended at various blend ratios. The blends were irradiated with electron beam in the same manner as described in Example 1 to carry out the curing test. A stainless steel plate was used as a substrate, and test pieces having a coating thickness of 0.2 mm were prepared.

The results are shown in Table 3.

TABLE 3

| Blend Ratio of n = 300/n = 18 | Curability | Adhesion | Pencil Hardness |
|---|---|---|---|
| 100/0 | 3 M rads | Good | HB |
| 75/25 | 2 M rads | Good | H |
| 50/50 | 1 M rad | Good | 2H |
| 0/100 | 1 M rad | Moderate | 4H |

EXAMPLE 4

One mole of an amino group-containing siloxane represented by the following formula:

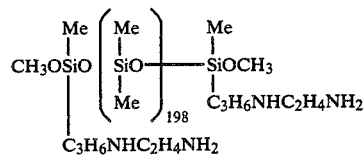

was reacted with 3.6 moles of 1,6-hexanediol diacrylate to obtain a modified silicone composition. The modified silicone composition was applied onto a polyethylene coated paper to a coating weight of 0.5 gram per square meter. The whole was then irradiated with electron beam having an acceleration energy of 165 KeV and an irradiation dose of 3 M rads in a nitrogen atmosphere from the side having silicone composition to obtain a cured film having gloss.

A tape comprising a polyester substrate and a pressure sensitive adhesive applied thereon (manufactured by Nitto Denko K.K., Japan, and marketed under the trade name "Lumilar 31B") was superposed on the cured film described above, and a 2.0 Kg roller was reciprocated twice. Thereafter, the whole was subjected to hot pressing for 20 hours at a temperature of 70° C. under a pressure of 20 g/cm², and then allowed to stand for 3 hours at a temperature of 25° C. The release resistance required for separating at the interface between the above described silicone cured film and the adhesive was measured under conditions of a direction of 180° and a tensile rate of 300 mm/minute by means of a tensile tester (manufactured by Toyo Seiki Seisakusho, Japan, and marketed under the trade name "Tensilon") to obtain a value of 45 grams per inch. The peel force in a transfer process using an acrylic self-adhesive (manufactured by Toyo Ink K.K., Japan, and marketed under the trade name "Olibain BPS-5127") was 24 grams per inch, and the percentage of residual adhesive strength (i.e., it is a rate of change of adhesive strength in a direction of 180° against a standard surface to be adhered (usually abraded stainless steel plate) before and after the self-adhesive is adhered to the releasing surface of the sample. Thus, its measure of releasability) was 82%.

EXAMPLE 5

One mole of amino-modified siloxane containing 200 dimethylsiloxane units, represented by the following formula:

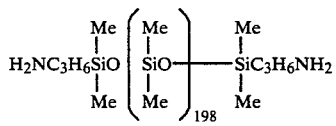

was reacted with 4.4 moles of neopentyl glycol diacrylate to obtain an acrylic functional modified silicone composition. This composition was applied to the previously corona treated polyethylene terephthalate film (38 micrometers) in an amount of 0.5 gram per square meter. The whole was irradiated with electron beam in the same manner as described in Example 1 to obtain a cured film having good transparency and gloss.

In the case of this cured film, the release resistance obtained in the same manner as described in Example 4 was 50 grams per inch, the peel force in the transfer process was 40 grams per inch, and the percentage of residual adhesive strength was 90%.

What is claimed is:

1. A radiation curable organic silicon compound comprising a reaction product of the following components (A) and (B), wherein (A) is an organic silicon compound having at least one amino group per molecule, represented by the following formula:

$$[H_2N(CH_2CH_2NH)_cR^1]_aR^2_bSiO_{(4-a-b)/2} \quad (1)$$

wherein $R^1$ is a divalent hydrocarbon group, $R^2$ is a substituted or unsubstituted monovalent hydrocarbon group, a and b are positive numbers which satisfy the relations: $0 < a \leq 3$, $0 < b \leq 3$ and $0 < a+b \leq 4$, and c is 0 or 1; and (B) is an acrylic compound having at least two acrylate groups per molecule, represented by the following formula:

$$\begin{array}{c} R^3 \\ | \\ CH_2=C-COO- \end{array} \quad (2)$$

Wherein $R^3$ is a hydrogen or methyl group, the reaction of components (A) and (B) being carried out by incorporating the acrylate in amounts of at least equimolar proportion to the primary amino group.

2. A cured releasing film comprising a cured filmy product obtained by irradiating with radiation an organic silicon compound of a reaction product of the following components (A) and (B), wherein (A) is an organic silicon compound having at least one amino group per molecule, represented by the following formula:

$$[H_2N(CH_2CH_2NH)_cR^1]_aR^2_bSiO_{(4-a-b)/2} \quad (1)$$

wherein $R^1$ is a divalent hydrocarbon group, $R^2$ is a substituted or unsubstituted monovalent hydrocarbon group, a and b are positive numbers which satisfy the relations: $0 < a \leq 3$, $0 < b \leq 3$ and $0 < a+b \leq 4$, and c is 0 or 1; and (B) is an acrylic compound having at least two acrylate groups per molecule, represented by the following formula:

$$\begin{array}{c} R^3 \\ | \\ CH_2=C-COO- \end{array} \quad (2)$$

wherein $R^3$ is a hydrogen or methyl group, the reaction of components (A) and (B) being carried out by incorporating the arcylate in amounts of at least equimolar proportion to the primary amino group.

3. The cured film according to claim 2 wherein said film is formed on a sheet-shaped substrate.

* * * * *